United States Patent [19]

Rang

[11] Patent Number: 4,879,143

[45] Date of Patent: Nov. 7, 1989

[54] PROCESS FOR THE PRODUCTION OF FLOOR COVERING

[75] Inventor: Klaus Rang, Blaustein, Fed. Rep. of Germany

[73] Assignee: Rang KG Haus Moderner Fussboden, Blaustein, Fed. Rep. of Germany

[21] Appl. No.: 93,743

[22] PCT Filed: Dec. 2, 1986

[86] PCT No.: PCT/DE86/00493

§ 371 Date: Jul. 30, 1987

§ 102(e) Date: Jul. 30, 1987

[87] PCT Pub. No.: WO87/03578

PCT Pub. Date: Jun. 18, 1987

[30] Foreign Application Priority Data

Dec. 6, 1985 [DE] Fed. Rep. of Germany ....... 3543184
Feb. 6, 1986 [DE] Fed. Rep. of Germany ....... 3603664

[51] Int. Cl.$^4$ .......................... B05D 3/00; B05D 7/04; B05D 7/06; B05D 7/24
[52] U.S. Cl. .................................... 427/387; 427/386; 427/393; 427/393.5; 427/403; 427/407.1; 427/408; 427/412.1
[58] Field of Search ..................... 427/243, 280, 393.6, 427/403, 386, 387, 393, 393.5, 407.1, 408, 412.1; 52/309.3, 309.17; 428/316.6, 317.5, 317.9

[56] References Cited

FOREIGN PATENT DOCUMENTS 1504261 9/1969 Fed. Rep. of Germany .
1927576 12/1969 Fed. Rep. of Germany .
7328721 1/1974 Fed. Rep. of Germany .
1367527 9/1974 United Kingdom .

OTHER PUBLICATIONS

English translation of German OS No. 1,927,576, PTO 88-2702, Washington, D.C., U.S. Patent and Trademark Office, Aug. 1988.
English translation of German Utility Model Patent No. 7,328,721, PTO 88-2703, Washington, D.C., U.S. Patent and Trademark Office, Sep. 1988.
English translation of excerpts, German OS No. 1,504,261, Washington, D.C., U.S. Patent and Trademark Office, Dec. 1987.

*Primary Examiner*—Evan Lawrence
*Attorney, Agent, or Firm*—Herbert Dubno

[57] ABSTRACT

A process for the production of floor covering, especially of the floating type for private and public areas, wherein a granulated material is mixed with a hardenable plastic binder to a paste-like mass, this mass being subsequently spread evenly on a surface, smoothed and then hardened. The grain size of the granulated material and/or the mixing proportions between the granulate and the binder are so selected that after the application and smoothing of the mass, neighboring granules of the granulated material are basically touching each other only in certain points, and, as a result of the hollow spaces existing between the individual grains of the granulated material wetted by the binder, the covered substrate is not wetted by the binder in a proportion of 40 to 70%, preferably 50%. A second layer of water-emulsifiable synthetic resin including a hydraulic binder is applied to the hardened floor covering to achieve an increase in mechanical load which can be supported by the hardened covering.

7 Claims, No Drawings

PROCESS FOR THE PRODUCTION OF FLOOR COVERING

BACKGROUND OF THE INVENTION

The invention relates to a process for the production of a floor covering, especially of a covering for private and public areas. It is meant for floors in living areas, kitchens, bathrooms, but also for terraces and balconies. In the public sector, it is meant for industrial-, storage- and commercial spaces, but also for doctors' offices, hospitals, schools and sports areas.

A process for the production of such floor coverings is known, wherein at first granulated material and a hardenable plastic binding means are mixed to a paste-like mass. Subsequently this mass is evenly spread over a surface and smoothed. After the hardening of this mass, a floor results which, due to the structure of its surface, is practically maintenance-free. In this known process, the granulated material consists of quartz gravel with a diameter of several millimeters.

Since this known type of floor completely covers and seals the substrate to which it is applied, it is required that the floor covering be applied only after the substrate has dried out completely. However, during construction it often happens that floors are laid out before the substrate, for instance plaster, is sufficiently dry. Sometimes, in order to save time, construction cannot be postponed for the length of time required for sufficient drying. When the known covering is spread on such a substrate which has not been dried sufficiently, blisters and cracks will shortly appear from evaporating moisture which causes the initially even and smooth surface of the floor covering to be damaged.

Among others, the invention has the object to improve the known process for the production of such a floor covering, so that it will become possible to apply the covering, even when the substrate has not sufficiently dried out.

Furthermore, it is desirable to use the known process also in cases of floating applications, whereby the covering is not bonded to the substrate, but is actually completely separated therefrom, due to the application of a separating layer.

SUMMARY OF THE INVENTION

In order to solve this problem, the known process is developed according to the invention in such a manner that the granule size in the granulated material and/or the proportion of the granulated material and the binder in the mixture are so selected that, after the mass is applied and smoothed, neighboring grains of the granulated material contact each other only in isolated points and the coated surface of the substrate is not wetted by the binder in a proportion of 40 to 70%, preferably of 50%, due to the hollow spaces existing between the individual grains of the granulated material wetted by the binder.

DETAILED DESCRIPTION

By using a two-component reaction resin as a binder for the mixture, namely a solvent-free two-component epoxy resin or polyurethane resin (solvent-containing or solvent-free) with a composition of various hardener systems, it has become possible, through precise determination of the proportion of binder with respect to the granule size of the granulated material, to achieve a connection to the substrate through resin dripping down the granules at the time of reaction. However, these resin drippings are not sufficient for the complete wetting of the substrate, whereby a bond of the covering to the substrate results which is vapor-permeable. By applying the teaching of the invention, the aforementioned occurence of blisters, and the separation of the covering from the substrate connected therewith has been shown no longer to be a problem.

By applying the invention to the production of a floating covering, wherein the substrate is covered at first with a separation layer, which for instance can be made of plastic foil, plastic fleece, paper- or cardboard layers, the process does not depend any more on the state of the substrate to be covered. The covering can be applied without the heretofore required preliminary operations, which for instance were necessary when the substrate was partially cracked and did not present a solid surface.

Also, up to now it was not possible to carry out a floating application with materials in thin layers, up to about 8 mm. the inherent tension of the heretofore-known materials have always lead to blisters and cracks during loose applications on separating layers. Due to the binding of the individual granules to each other and to the separation layer, so that they make contact only in certain points, no shrinkage tension occurs. Furthermore, the covering comes to rest completely strain-free on the separation layer.

When the thickness of the layer to be applied is doubled (approx. 15 mm) or tripled (approx. 20 to 25 mm) a self-supporting structure is obtained, similar to a floating floor plaster. While the latter has to have certain minimum thickness values because of its shrinkage tensions, the coverings produced by the process according to the invention can have thicknesses much lower than that. Therefore, the process according to the invention offers the possibility to replace the simple separation foils with insulating materials such as cork, extruded expanded polystyrene, expanded polyurethane or such, forming a thermo-insulating layer underneath the covering. This is particularly important in the renovation of older buildings, where often sufficient construction heights are not available.

When using the process according to the invention, it is also possible to apply the covering with various thicknesses, which in the heretofore known processes would have unavoidably, resulted in cracks, due to the strain differences.

Among the suitable granulated materials which can be used in the process according to the invention, are quartz gravel as well as marble splinters, metal balls or granules and also other materials such as porcelain, glass, synthetic materials, bricks or recycled materials with a grain size between 2 and 10 mm.

A particularly pleasing covering produced with the method according to the invention is obtained when there is employed a granulated material consisting of balls with identical or close diameters, made of metal, preferably steel, or of glass or plastic. These balls can also have a diameter between 2 to 10 mm.

In these types of granulated materials a very uniform wetting of the granulated particles is achieved, as well as of the substrate. Uniformity is achieved because the binder drips down over the circumference of the balls resulting in an even distribution of the binder-free portions of the substrate or of the separation layer.

The use of small balls or granules has also further advantages. Through various coloring of the balls or granules, certain patterns can be created in then floor covering, whereby a variety of optical effects can be produced. As long as it does not concern very large surfaces, such a type of granulated material consisting of balls can also be used in the afore-mentioned known process. In the case of small surfaces or when the substrate is already completely dry, there is no danger of any cracking in the covering.

In order to increase the solidity of a floor covering produced according to the invention, which could be necessary especially in the case of industrial floors, a further development of the invention proposes to spread a second coating of a water-emulsifiable synthetic resin, to which a hydraulic binder has been admixed, on top of the already applied and hardened floor covering. In this second process step, the hollow spaces left after the first process step in the floor covering can be completely filled by the utilized hydraulically binding masses and compounded plastics. When hydraulic fillers are used, it is insured that the vapor-permeability of the floor covering is maintained, in spite of the fact that through the filling of the hollow spaces, an increase in the compression- and bending resistance has been achieved.

Finally, it has again to be pointed out that, in order to carry out the process according to the invention, any desired material such as the already mentioned quartz gravel or marble splinters, as well as porcelain, melting products, wood, glass, plastics, rubber, metals, and recycled materials can be used.

What is claimed is:

1. A process for the production of a floor covering which may be a floating covering, said process comprising:

mixing a granulated material and a hardenable plastic binder into a paste-like mass in such manner that individual particles of said granulated material are attached to each other only at certain points;

spreading said mass evenly upon a surface to be covered;

smoothing said spread mass;

hardening said smoothed and spread mass into said floor covering;

selecting prior to mixing, the proportion of said granulated material and binder so as to ensure that said surface to be covered is not wetted in a proportion of 40 to 70 % by the binder as the binder drips into hollow spaces existing between individual granules of the granulated material during the hardening step; and applying to said hardened floor covering a second layer of water-emulsifiable synthetic resin including a hydraulic binding means, to achieve an increase in mechanical load which can be supported by the hardened floor covering.

2. Process according to claim 1 wherein the proportion of the surface that is not wetted is 50%.

3. Process according to claim 1 wherein the granulated material is selected from the group consisting of quartz gravel and metal granules with a grain size between 2 and 10 mm.

4. Process according to claim 1 wherein the granulated material is in the form of balls having substantially similar diameters, said balls being made of a material selected from the group consisting of metal, glass, plastic and mixtures thereof with a diameter between 2 and 10 mm.

5. Process according to claim 1 wherein prior to the spreading of said mass, there is a further step of applying a separation layer to achieve thermal insulation to the surface to be covered.

6. Process according to claim 5 wherein said separation layer is formed from insulating materials selected from the group consisting of cork, polystyrene and polyurethane.

7. Process according to claim 1 wherein the covering is applied with a layer thickness of at least 8 mm.

* * * * *